US010321470B2

(12) United States Patent
Ro et al.

(10) Patent No.: US 10,321,470 B2
(45) Date of Patent: Jun. 11, 2019

(54) METHOD AND APPARATUS FOR EMPLOYING RESOURCE FOR DEVICE-TO-DEVICE (D2D) WIRELESS COMMUNICATION (71) Applicant: Samsung Electronics Co., Ltd., Gyeonggi-do (KR)

(72) Inventors: Sangmin Ro, Seoul (KR); Yongjun Kwak, Gyeonggi-do (KR); Hyoungju Ji, Seoul (KR)

(73) Assignee: Samsung Electronics Co., Ltd (KR)

( * ) Notice: Subject to any disclaimer, the term of this patent is extended or adjusted under 35 U.S.C. 154(b) by 338 days.

(21) Appl. No.: 15/039,981

(22) PCT Filed: Nov. 27, 2014

(86) PCT No.: PCT/KR2014/011477
§ 371 (c)(1),
(2) Date: May 27, 2016

(87) PCT Pub. No.: WO2015/080486
PCT Pub. Date: Jun. 4, 2015

(65) Prior Publication Data
US 2018/0199351 A1    Jul. 12, 2018

(30) Foreign Application Priority Data
Nov. 27, 2013  (KR) .................... 10-2013-0145622

(51) Int. Cl.
*H04W 72/10*    (2009.01)
*H04W 72/02*    (2009.01)
(Continued)

(52) U.S. Cl.
CPC ............ *H04W 72/10* (2013.01); *H04W 72/02* (2013.01); *H04W 72/044* (2013.01); *H04W 74/0833* (2013.01)

(58) Field of Classification Search
None
See application file for complete search history.

(56) References Cited

U.S. PATENT DOCUMENTS

2010/0017846 A1*  1/2010  Huang ............... H04L 12/14
                                                         726/1
2011/0282989 A1   11/2011  Geirhofer et al.
(Continued)

FOREIGN PATENT DOCUMENTS

KR    1020130039735    4/2013
KR    1020130122572    11/2013
(Continued)

OTHER PUBLICATIONS

PCT/ISA/210 Search Report issued on PCT/KR2014/011477 (pp. 3).
(Continued)

*Primary Examiner* — Kevin C. Harper
*Assistant Examiner* — Derrick V Rose
(74) *Attorney, Agent, or Firm* — The Farrell Law Firm, P.C.

(57) ABSTRACT

Provided are a method and apparatus for transmitting control information in device-to-device (D2D) communication. A D2D communication method for a transmitting user equipment (Tx UE) may include: sending a channel sensing signal containing priority information of the Tx UE and data; checking whether a resource transfer request message containing priority information is received from a receiving user equipment (Rx UE); checking, when a resource transfer request message is received, whether the priority of the Tx UE is lower than the priority of the Rx UE; and terminating, when the priority of the Tx UE is lower than the priority of the Rx UE, transmission of the data. As the channel sensing signal required for D2D communication based on distributed resource allocation is used to convey priority information, it
(Continued)

is possible to minimize overhead due to introduction of additional control channels and signals for acquiring radio resources.

16 Claims, 5 Drawing Sheets

(51) Int. Cl.
*H04W 72/04* (2009.01)
*H04W 74/08* (2009.01)

(56) References Cited

U.S. PATENT DOCUMENTS

| | | | |
|---|---|---|---|
| 2011/0317569 A1* | 12/2011 | Kneckt | H04W 74/0833 370/252 |
| 2013/0148566 A1 | 6/2013 | Doppler et al. | |
| 2014/0016574 A1 | 1/2014 | Seo et al. | |
| 2014/0099950 A1 | 4/2014 | Mildh et al. | |
| 2014/0120934 A1 | 5/2014 | Kishiyama | |
| 2016/0192420 A1* | 6/2016 | Kim | H04W 74/00 370/329 |
| 2016/0270123 A1* | 9/2016 | Wang | H04W 74/0875 |

FOREIGN PATENT DOCUMENTS

| | | |
|---|---|---|
| WO | WO 2013/002206 | 1/2013 |
| WO | WO 2013/002688 | 1/2013 |
| WO | WO 2013/157906 | 10/2013 |

OTHER PUBLICATIONS

PCT/ISA/237 Written Opinion issued on PCT/KR2014/011477 (pp. 6).

Liu, Junyu et al., A Distributed Opportunistic Scheduling Protocol for Device-to-Device Communications, 2013 IEEE 24th International Symposium on Personal, Indoor and Mobile Radio Communications: MAC and Cross-Layer Design Track, Copyright 2013 IEEE, pp. 1715-1719.

* cited by examiner

METHOD AND APPARATUS FOR EMPLOYING RESOURCE FOR DEVICE-TO-DEVICE (D2D) WIRELESS COMMUNICATION

PRIORITY

This application is a National Phase Entry of PCT International Application No. PCT/KR2014/011477, which was filed on Nov. 27, 2014, and claims priority to Korean Patent Application No. 10-2013-0145622, which was filed on Nov. 27, 2013, the contents of each of which are incorporated herein by reference.

TECHNICAL FIELD

The present invention relates to a method and apparatus for resource management in device-to-device (D2D) communication. More particularly, the present invention relates to a procedure whereby a user equipment performing D2D communication obtains radio resources and to a method and apparatus for exchanging information therefor.

BACKGROUND ART

In the 3rd Generation Partnership Project (3GPP) serving as a standardization body for asynchronous cellular mobile communication, discussions are underway to cover not only existing wireless communication between base station (ENB) and user equipment (UE) but also wireless communication between UEs or devices (i.e. D2D communication) in the Long Term Evolution (LTE) system specification.

Public safety services are one of the main functions required for 3GPP D2D communication. That is, LTE-based wireless communication is to be available within and between groups of police officers, fire fighters, and government officials even in the case of emergencies (e.g. natural disasters) where normal network services are not available. In the case of an emergency, one-to-many broadcast communication covering an entire group or all groups is more efficient than one-to-one unicast communication between members in one group. In the 3GPP, there has been an agreement on the use of D2D broadcast communication in Release 12 specifications.

In D2D communication, a transmitting UE (Tx UE) may use one of the following two schemes for radio resources. First, there is a centralized resource allocation scheme, where a Tx UE may be allocated radio resources to use by a given resource allocation agent. Here, the resource allocation agent may perform a function similar to that of a base station in cellular communication, and a designated UE may perform the resource allocation function when the network fails to provide a normal service. In an ideal case, the UE undertaking resource allocation may perform radio resource scheduling for other UEs in its coverage, making it possible to conduct D2D communication without resource conflicts.

However, in the case of centralized resource allocation, it is necessary to separately define a scheme for selecting a UE to undertake resource allocation. As a UE undertaking resource allocation has to support the function of a base station, device complexity increases. It is also necessary to define a control channel for exchanging resource allocation information. When multiple UEs undertaking resource allocation are closely placed in a region, coordination therebetween is needed to prevent conflicts in resource allocation in the region. Base stations may exchange coordination information through wired links. However, it is necessary to define separate physical channels or signals for exchanging coordination information between UEs undertaking resource allocation.

Second, there is a distributed resource allocation scheme, where a Tx UE may directly select radio resources to use. In general, a Tx UE may select radio resources through Channel Sense Multiple Access/Collision Avoidance (CSMA/CA). That is, a Tx UE performs channel sensing on a radio resource region configured for D2D communication to identify whether the corresponding radio resource is used by another UE for D2D communication. If the corresponding radio resource is used by another UE, the Tx UE continues channel sensing to find an available (empty or unused) radio resource. If the corresponding radio resource is not used (available), the Tx UE may use the corresponding radio resource to send a signal. Here, the Tx UE using the radio resource is required to send a channel sensing signal to notify the radio resource being used to other UEs performing channel sensing. The channel sensing signal may have a sequence-based structure like a random access preamble or a reference signal.

In the case of distributed resource allocation, a resource collision may arise when multiple Tx UEs simultaneously send a signal on the assumption that a radio resource is available after channel sensing. As a UE does not have to undertake resource allocation like the function of a base station, device complexity does not increase. Distributed resource allocation may be operable through minimal signaling based on a channel sensing signal because UEs undertaking resource allocation and coordination therebetween are not necessarily required unlike the case of centralized resource allocation. In particular, a random backoff algorithm may be applied to alleviate the problem of resource collision between Tx UEs. That is, a Tx UE performs channel sensing. If an empty or unused radio resource is found, the Tx UE continues channel sensing for a randomly selected backoff time. If a channel sensing signal from another UE is not detected during the backoff time, the Tx UE starts transmission using the found radio resource. Otherwise, the Tx UE stops the backoff procedure.

DISCLOSURE OF INVENTION

Technical Problem

In D2D communication based on distributed resource allocation, there is a need for a scheme whereby a UE occupies a radio resource in an efficient manner. For example, when a radio resource is not available owing to the exhaustion of limited D2D radio resources, if UEs currently occupying the D2D radio resources continue to use the same resources, it is not possible to ensure fairness in radio resource utilization between D2D users. In the case of emergencies, it is necessary to allocate D2D radio resources to emergency workers for immediate communication. For efficient resource utilization through overhead reduction, it is necessary to minimize introduction of new signaling mechanisms needed for the resource allocation scheme.

The present invention has been made in view of the above problems. Accordingly, an aspect of the present invention is to provide a procedure whereby a UE may obtain D2D radio resources in an efficient manner without additional signaling, and a method and apparatus for exchanging information therefor.

The aspects, features and advantages of certain embodiments of the present invention will be more apparent from the following detailed description taken in conjunction with the accompanying drawings.

Solution to Problem

In accordance with an aspect of the present invention, there is provided a method of device-to-device (D2D) communication for a transmitting user equipment (Tx UE). The method may include: sending a channel sensing signal containing priority information of the Tx UE and data; checking whether a resource transfer request message containing priority information is received from a receiving user equipment (Rx UE); checking, when a resource transfer request message is received, whether the priority of the Tx UE is lower than the priority of the Rx UE; and terminating, when the priority of the Tx UE is lower than the priority of the Rx UE, transmission of the data.

The resource transfer request message may be received through a pre-configured resource.

The priority information may be assigned and stored in advance in the Tx UE and Rx UE on a per-UE basis.

The priority information may be assigned to the Tx UE and Rx UE on the basis of the service type of data being sent or to be sent.

The method may further include terminating transmission of the data when a resource transfer request message containing a top-priority indication is received from the Rx UE.

In accordance with another aspect of the present invention, there is provided a method of device-to-device (D2D) communication for a receiving user equipment (Rx UE). The method may include: receiving a channel sensing signal containing priority information of a transmitting user equipment (Tx UE); checking whether the priority of the Rx UE is higher than the priority of the Tx UE; sending, when the priority of the Rx UE is higher than the priority of the Tx UE, a resource transfer request message containing priority information of the Rx UE; and performing channel sensing for a preset or randomly selected duration.

The resource transfer request message may be sent through a pre-configured resource.

In accordance with another aspect of the present invention, there is provided a transmitting user equipment (Tx UE) supporting device-to-device (D2D) communication. The Tx UE may include: a communication unit to communicate with another UE; and a control unit to control a process of sending a channel sensing signal containing priority information of the Tx UE and data, checking whether a resource transfer request message containing priority information is received from a receiving user equipment (Rx UE), checking, when a resource transfer request message is received, whether the priority of the Tx UE is lower than the priority of the Rx UE, and terminating, when the priority of the Tx UE is lower than the priority of the Rx UE, transmission of the data.

In accordance with another aspect of the present invention, there is provided a receiving user equipment (Rx UE) supporting device-to-device (D2D) communication. The Rx UE may include: a communication unit to communicate with another UE; and a control unit to control a process of receiving a channel sensing signal containing priority information of a transmitting user equipment (Tx UE), checking whether the priority of the Rx UE is higher than the priority of the Tx UE, and sending, when the priority of the Rx UE is higher than the priority of the Tx UE, a resource transfer request message containing priority information of the Rx UE and performing channel sensing for a preset or randomly selected duration.

Advantageous Effects of Invention

In a feature of the present invention, there is provided a scheme that enables a UE to occupy a radio resource and send a signal indicating radio resource occupation. Here, the channel sensing signal required for D2D communication based on distributed resource allocation is used to convey priority information. Hence, it is possible to minimize overhead due to introduction of additional control channels and signals for acquiring radio resources.

The priority assignment scheme of the present invention enables D2D UEs to acquire radio resources in a manner suitable for D2D communication.

A high-priority UE may send a resource transfer request message by use of a channel sensing signal and acquire a radio resource, which has been occupied by a UE having received the resource transfer request message, without having to receive a separate response message. Hence, it is possible to minimize overhead due to introduction of additional control channels and signals.

Other features and advantages of the present invention will be more apparent from the following detailed description taken in conjunction with the accompanying drawings.

MODE FOR THE INVENTION

Hereinafter, exemplary embodiments of the present invention are described in detail with reference to the accompanying drawings. Detailed descriptions of well-known functions and structures incorporated herein may be omitted to avoid obscuring the subject matter of the present invention. Particular terms may be defined to describe the invention in the best manner Accordingly, the meaning of specific terms or words used in the specification and the claims should not be limited to the literal or commonly employed sense, but should be construed in accordance with the spirit of the invention.

The following description of embodiments of the present invention is focused on the 3GPP LTE standards. However, it should be understood by those skilled in the art that the subject matter of the present invention is applicable to other communication systems having similar technical backgrounds and channel configurations without significant modifications departing from the scope of the present invention.

Next, a description is given of design and transmission of a channel sensing signal according to an embodiment of the present invention.

As described before, the channel sensing signal may be designed to have a sequence-based structure. This enables simplified channel sensing through sequence correlation. It is possible to generate a channel sensing signal so as to convey priority information as follows.

First, a sequence set is formed to include a preset number of sequences needed to represent priority information, and each sequence of the sequence set is mapped with a priority value. As such, upon detection of a channel sensing signal, a receiving UE (Rx UE) may examine the sequence of the channel sensing signal with respect to the configured sequence set to identify the priority value indicated by the sequence.

Second, it is possible to introduce an input variable reflecting priority information into the sequence generation function. For ease of description, an equation for generating a demodulation reference signal (DMRS) is used as an example. Equation 1 illustrates a DMRS generation equation for the LTE uplink.

$$r_{u,v}^{(\alpha)}(n) = e^{j*\alpha*n} \overline{r_{u,v}}(n), 0 \leq n \leq M_{SC}^{RS}$$ [Equation 1]

Here, $r_{u,v}^{(\alpha)}(n)$ indicates a DMRS sequence and denotes a base sequence $\overline{r_{u,v}}(n)$ with a cyclic shift $\alpha$. $M_{SC}^{RS}$ indicates the length of the DMRS sequence and is defined by a multiple of the number of resource blocks (RBs) in the frequency domain. One RB consists of 12 subcarriers. As the subcarrier spacing is 15 kHz, one RB occupies 180 kHz in the frequency domain. In LTE, the basic unit of resource allocation is one RB. $M_{SC}^{RS}$ cannot exceed a length corresponding to the uplink channel bandwidth. Base sequences $\overline{r_{u,v}}(n)$ may be divided into 30 groups with group index $u \in \{0, 1, \ldots, 29\}$ and base sequence index v in a group. Each group may contain one base sequence (v=0) or two base sequences (v=0, 1) according to the length of the DMRS sequence (i.e. size in the frequency domain). These base sequences take a form of the Zadoff-Chu (ZC) sequence.

The cyclic shift $\alpha$ and base sequence group index u may be used as a variable representing priority information of the present invention. For example, when priority information can be represented by two state values '0' and '1', cyclic shift $\alpha=0$ may be made to correspond to the value of '0' and cyclic shift $\alpha=1$ may be made to correspond to the value of '1'. Here, n indicates a nonzero value within the range of the cyclic shift. Alternatively, the base sequence group index of u=0 may be set to correspond to the state value of '0', and the index of u=1 may be set to correspond to the state value of '1'. As an extension, possible cyclic shift values may be divided into two groups, and one group may be set to correspond to the state value of '0' and the other group may be set to correspond to the state value of '1'. Similarly, base sequence group index values may be divided into two groups, and one group may be set to correspond to the state value of '0' and the other group may be set to correspond to the state value of '1'. The state values of priority information may also be represented by a combination of the cyclic shift and the base sequence group index. In this example, the priority information is assumed to have two state values. However, it is possible to extend the above approaches so that the priority information may have more than two state values.

In addition to the DMRS, an equation for generating a random access preamble sequence in the LTE is used as an example. Equation 2 illustrates a random access preamble sequence generation equation.

$$x_{u,v}(n) = x_u((n+C_v) \bmod N_{ZC})$$ [Equation 2]

Here, $x_u(n)$ indicates the $u^{th}$ root ZC sequence, $N_{ZC}$ indicates the length of the ZC sequence, and $C_v$ indicates the cyclic shift. Similarly to the case of the DMRS sequence, the root ZC sequence index u and cyclic shift $C_v$ or a combination thereof may be used as an input variable representing priority information.

When a channel sensing signal is detected, an Rx UE may compute correlation between the channel sensing signal and possible sequences generatable using the above approach and identify the priority information indicated by the most highly correlated sequence.

In various embodiments, to prevent an increase in channel sensing signal detection complexity of Rx UEs, it is possible to limit the number of values that the input variable of the sequence generation function may have according to the number of state values of the priority information.

In various embodiments, the order of precedence between state values of the priority information may be determined according to a preset rule. For example, when priority information has three state values '0', '1' and '2', the values '0', '1' and '2' may be made to correspond respectively to high priority, medium priority, and low priority. The order of precedence may also be reversed.

As an embodiment of the present invention, for D2D communication based on distributed resource allocation, there is provided a method whereby a Tx UE sends a channel sensing signal containing priority information of the Tx UE. The method may include: a step at which the Tx UE generates a channel sensing signal on the basis of the priority information and sends the channel sensing signal; a step at which an Rx UE receives the channel sensing signal and identifies the priority information of the Tx UE; a step at which the Rx UE compares its own priority with the received priority; a step at which the Rx UE delays transmission and performs channel sensing, or sends a resource transfer request signal and performs channel sensing for a given time, according to the comparison result; and a step at which the Rx UE sends data after finding an unused resource through channel sensing.

In one embodiment, to notify priority information via a channel sensing signal, at least one of the sequence, frequency resource, and time resource of the channel sensing signal is utilized.

In one embodiment, the time duration for which a UE performs channel sensing after sending a resource transfer request may be set according to a preset value or system defined value.

In one embodiment, priority values may be assigned to individual UEs according to types of users of the UEs. For example, for a group of police officers, the UE of the commander of the group may be assigned a higher priority in comparison to those UEs of regular members of the group.

In one embodiment, priority values may be assigned according to types of services.

For example, a UE sending voice data may be assigned a higher priority in comparison to a UE sending ordinary data.

In one embodiment, when priority information is set according to different criteria (e.g. user and service described above), the rule to determine the order of precedence between the criteria may be predefined and priority values may be assigned according to the rule.

In one embodiment, the highest priority may be assigned to particular data as an exception to the above rules with respect to user, service, or a combination thereof.

Next, a detailed description is given of embodiments of the present invention.

Figure 1:
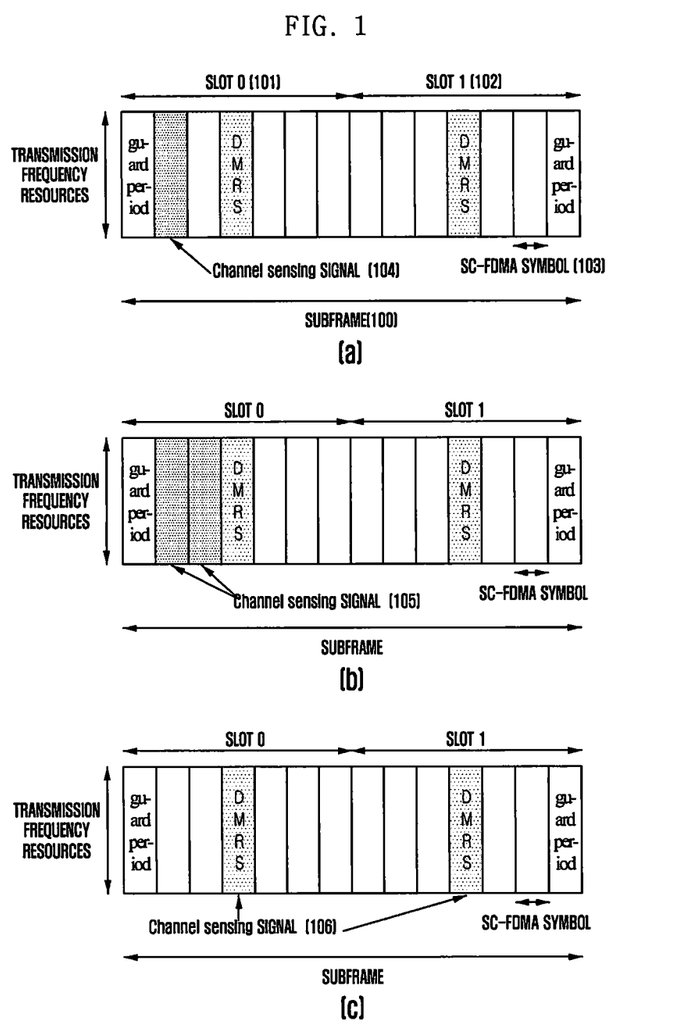
FIG. 1 illustrates designs for a channel sensing signal according to an embodiment of the present invention.

FIG. 1 illustrates designs for a channel sensing signal according to an embodiment of the present invention. Here, it is assumed that the frame structure is for the LTE uplink.

Referring to FIG. 1, one subframe 100 is 1 ms long and is divided into two slots, i.e., slot 0 (101) and slot 1 (102). Each slot includes 7 SC-FDMA (single carrier-frequency division multiple access) symbols 103. It is assumed that the first and last SC-FDMA symbols of a subframe are used as a guard period (GP). The guard period is used for Tx/Rx switching operation of a UE in the case of half-duplex mode in D2D communication. The middle SC-FDMA symbol of each slot is used to transmit a demodulation reference signal (DMRS) covering the allocated frequency domain.

Part (a) of FIG. 1 illustrates use of a channel sensing signal having a structure based on a preamble or RS different from the DMRS. In one embodiment, a channel sensing signal 104 may be sent via an SC-FDMA symbol immediately after the guard period of slot 0.

Part (b) of FIG. 1 illustrates use of a channel sensing signal having a structure based on a preamble or RS different from the DMRS, where a channel sensing signal may be sent via two SC-FDMA symbols between the guard period and DMRS of slot 0 as indicated by indicia 105. According to embodiments, the channel sensing signal 105 may be designed to have a preamble or RS sequence of a preset length, so that it may be sent via one SC-FDMA symbol or two SC-FDMA symbol.

The channel sensing signal shown in part (b) of FIG. 1 may be used to convey multiple pieces of priority information. For example, the channel sensing signal sequence corresponding to one SC-FDMA symbol may be used to notify the priority based on the service type of data being sent, and the channel sensing signal sequence corresponding to the other SC-FDMA symbol may be used to notify the priority based on the user of the Tx UE. In one embodiment, at the time of sequence generation using a channel sensing signal sequence being two SC-FDMA symbols long, it is possible to identify priority information corresponding to a combination of service information and user information through cyclic shifts. Part (b) of FIG. 1 illustrates a channel sensing signal occupying two SC-FDMA symbols. However, the interval of a channel sensing signal is not limited to two SC-FDMA symbols. It is possible to convey combined priority information via multiple SC-FDMA symbols.

In part (c) of FIG. 1, channel sensing signals 106 are used as DMRS. In this case, channel sensing signals 106 are DMRS sequences placed at the middle of slot 0 and slot 1. When a channel sensing signal is detected, an Rx UE may compute correlation between the channel sensing signal and possible sequences and identify the priority information indicated by the most highly correlated sequence. At the same time, the Rx UE may perform channel estimation based on the most highly correlated sequence to demodulate a received signal. In one embodiment, the DMRS of slot 0 and the DMRS of slot 1 may be used to convey different pieces of priority information. The structure shown in part (c) of FIG. 1 may exert influence on decoding performance of the Rx UE.

The position and number of SC-FDMA symbols used to transmit a channel sensing signal are not limited to the above examples. According to embodiments, the channel sensing signal may be sent at any position of slot 0 and slot 1.

In a different embodiment, the time-frequency position of a channel sensing signal may be varied according to priority information, so that an Rx UE having detected a channel sensing signal may identify priority information indirectly on the basis of the position of an SC-FDMA symbol occupied by the channel sensing signal in a subframe or the position of an RB region occupied by the channel sensing signal. For example, when priority information may have two state values, referring to part (a) of FIG. 1, the channel sensing signal carrying one state value may be sent via an SC-FDMA symbol immediately after the guard period of slot 0 (the same as shown in part (a)), and the channel sensing signal carrying the other state value may be sent via an SC-FDMA symbol immediately before the DMRS of slot 0. Here, two SC-FDMA symbols before the DMRS of slot 0 are used for detection of a channel sensing signal, and data may be not sent during the period of the two SC-FDMA symbols.

Figure 2:
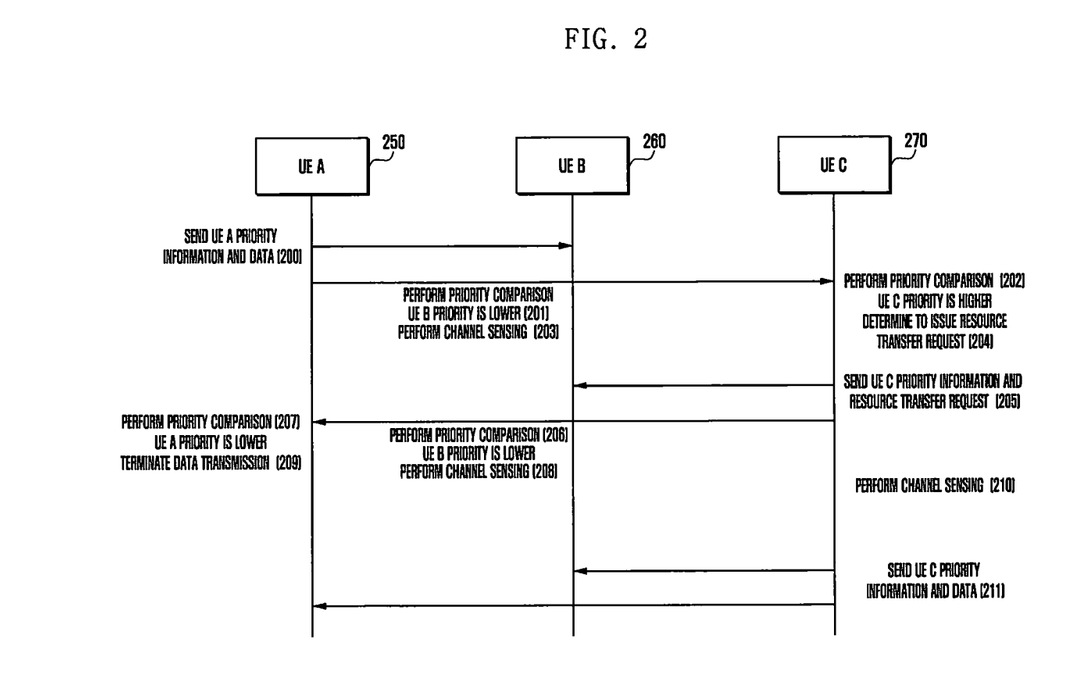
FIG. 2 illustrates a D2D communication scheme according to an embodiment of the present invention.

FIG. 2 illustrates a D2D communication scheme according to an embodiment of the present invention.

In FIG. 2, UE A (250), UE B (260) and UE C (270) take part in D2D communication. Here, it is assumed that each UE has data to send and UE A (250) is currently transmitting. It is also assumed that data transmission is carried out through time division multiplexing (TDM) and the entire frequency domain reserved for D2D communication is used for data transmission. Among UE A (250), UE B (260) and UE C (270), UE C (270) is assumed to have the highest priority and UE B (260) is assumed to have the lowest priority.

Referring to FIG. 2, at step 200, UE A (250) sends a channel sensing signal containing its own priority information and data to UE B (260) and UE C (270). Here, as assumed above, UE B (260) and UE C (270) receiving data from UE A (250) each have data to send. Hence, at the same time, UE B (260) and UE C (270) perform channel sensing to find unused resources. UE B (260) and UE C (270) each obtain priority information from the channel sensing signal from UE A (250). At step 201, UE B (260) compares its own priority with the priority of UE A (250). At step 202, UE C (270) compares its own priority with the priority of UE A (250). As described above, transmission of priority information through a channel sensing signal enables notification of priority information to different UEs (e.g. UE B and UE C), each of which may then compare its own priority with the priority of the Tx UE (e.g. UE A).

The above priority information is described in detail later.

As UE B (260) has a lower priority than UE A (250) currently occupying D2D radio resources, at step 203, UE B (260) postpones data transmission and continues channel sensing.

On the other hand, as UE C (270) has a higher priority than UE A (250) currently occupying D2D radio resources, at step 204, UE C (270) may determine to issue a resource transfer request via a pre-configured resource, so that the current Tx UE (i.e. UE A) may release the resource being used. At step 205, UE C (270) sends a resource transfer request signal to UE A (250) and UE B (260) via a pre-configured resource. In one embodiment, UE C (270) may send a channel sensing signal containing a resource transfer request and its own priority information. Here, the pre-configured resource is used to transmit a resource transfer request signal and may be a time-frequency resource monitored by every D2D UE. According to embodiments, the pre-configured resource may be all of one or more subframes, a resource region of at least one subframe used for transmission and reception of a channel sensing signal, or a time-frequency region of at least one subframe. In this case, all D2D UEs may monitor the pre-configured resource to detect a channel sensing signal carrying a resource transfer request, enabling each D2D UE to detect reception of a resource transfer request without separate identification information. That is, a UE having data to send may transmit a channel sensing signal containing its priority information via the pre-configured transfer request resource, thereby notifying proximate UEs including the current Tx UE of data to send and requesting the current Tx UE to release the resource being used. Therefore, UE C (270) may send a resource transfer request to UE A (250) and UE B (260) by use of the existing channel sensing signal without introduction of separate signaling.

Both UE A (250) currently sending data and UE B (260) currently receiving data from UE A (250) may monitor the pre-configured resource and receive a channel sensing signal from UE C (270). Thereafter, at step 206, UE B (260) identifies the priority of UE C (270) having made a resource transfer request and compares its own priority with the priority of UE C (270). At step 207, UE A (250) identifies the priority of UE C (270) having made a resource transfer request and compares its own priority with the priority of UE C (270).

As UE B (260) has a lower priority than UE C (270), at step 208, UE B (260) continues channel sensing to find a resource to be used for data transmission.

As UE A (250) has a lower priority than UE C (270) having made a resource transfer request, at step 209, UE A (250) suspends data transmission and releases the resource being used, yielding the resource to UE C (270).

At step 210, UE C (270) performs channel sensing for the resource released by UE A (250) for a randomly selected or preset duration. If an unused resource is found, at step 211, UE C (270) performs data transmission. If an unused resource is not found, UE C (270) may send a channel sensing signal containing resource transfer request via the next transfer request resource. Although not shown, if UE A (250) has a higher priority than UE C (270), UE A (250) may continue data transmission using the occupied resource without regard to the resource transfer request from UE C (270). Then, after sending the resource transfer request, UE C (270) may receive a channel sensing signal from UE A (250) during channel sensing at step 210. As no unused resource is found, UE C (270) may postpone data transmission, perform channel sensing, and issue a resource transfer request.

In FIG. 2, when UE A (250) receives a channel sensing signal containing a resource transfer request from UE C (270), UE A (250) does not have to send a response message to UE C (270). That is, for a resource transfer request from UE C (270) having a higher priority, UE A (250) does not have to send a response message indicating acceptance or rejection of the request to UE C (270) via separate signaling. This is because UE C (270) may determine availability of a resource through channel sensing at step 210.

In one embodiment, for fairness and efficiency of D2D resource usage, it is possible to reduce harmful effect of indefinite resource occupation by placing a time limit on the duration for which a UE may occupy a resource for data transmission at a time.

As described above, channel sensing signals required for D2D communication based on distributed resource allocation may be used to enable D2D UEs to acquire and use resources with minimum signaling without separate channel and feedback designs for coordination between UEs.

Figure 3:
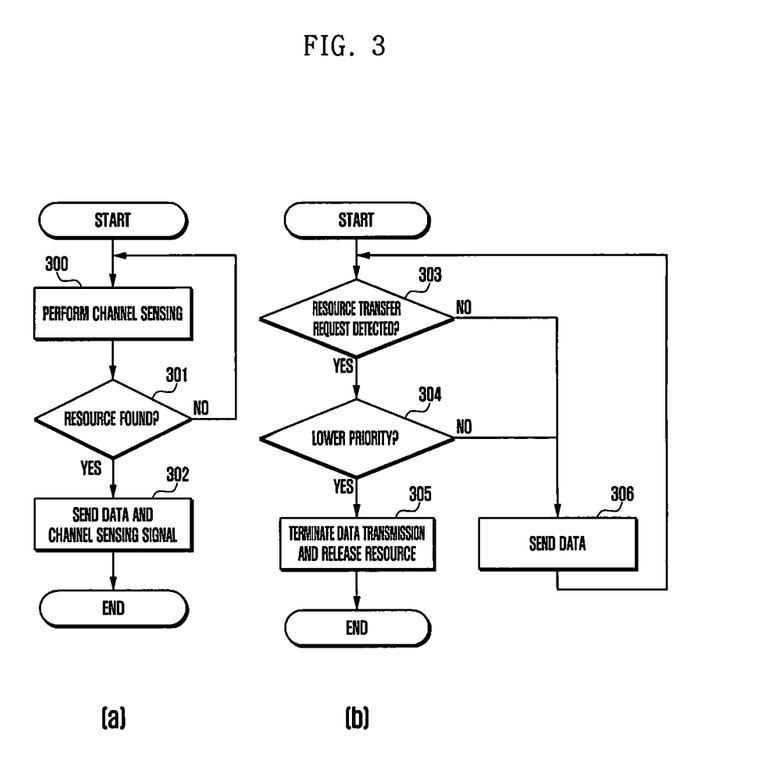
FIG. 3 illustrates D2D Tx UE operation according to an embodiment of the present invention.

FIG. 3 illustrates D2D Tx UE operation according to an embodiment of the present invention.

Part (a) of FIG. 3 illustrates a procedure whereby a Tx UE performs data transmission. At step 300, a UE having data to send performs channel sensing to find an unused resource. If an unused resource is found, at step 302, the UE sends a channel sensing signal containing its priority information and data. If an unused resource is not found, the procedure returns to step 300 at which the UE continues channel sensing.

Part (b) of FIG. 3 illustrates a procedure whereby a Tx UE occupying a resource yields the resource. At step 303, the Tx UE occupying a resource and sending data monitors a pre-configured transfer request resource to detect a channel sensing signal, i.e. resource transfer request, from another UE. The pre-configured resource for a resource transfer request is described in connection with FIG. 2, and a description thereof is omitted.

If a resource transfer request is detected at step 303, at step 304, the Tx UE identifies the priority information of a UE having sent the resource transfer request and compares its own priority with the priority of the a UE having sent the resource transfer request. If the priority of the Tx UE is lower than that of the UE having sent the resource transfer request, at step 305, the Tx UE suspends data transmission and yields the occupied resource. Here, as described before, the Tx UE does not have to send a separate response message to the UE having sent the resource transfer request.

If the priority of the Tx UE is not lower than that of the UE having sent the resource transfer request, at step 306, the Tx UE continues data transmission. If a resource transfer request is not detected at step 303, at step 306, the Tx UE continues data transmission.

In one embodiment, priority values may be assigned to individual UEs in a fixed manner according to levels of authority of users. For example, in the case of a group of police officers, firefighters or government officials, the UE of the commander of the group may be assigned the highest priority, UEs of managers may be assigned the next highest priority, and UEs of regular members may be assigned the lowest priority.

In one embodiment, priority values may be assigned to individual UEs according to types of associated services. Here, the priority of a specific UE may be determined in a variable manner according to the service type of data being carried by the UE, unlike the above case where each UE has a fixed priority. For example, services may be divided into a voice service and data service, and priority values may be assigned so that a UE using a voice service has a higher priority than a UE using a data service. This is because a voice service may have an advantage over a data service when prompt action is necessary in an emergency situation. It is also possible to assign priorities in reverse order. Meanwhile, the priority of a specific UE may be assigned according to other information. For example, a Tx UE may be assigned the top priority and may send a channel sensing signal containing top priority information. Upon reception of top priority information, an Rx UE may immediately determine that the Tx UE is of a higher priority than the Rx UE without a necessity for priority comparison. Use of top priority information may be applied to an Rx UE having data to send.

Figure 4:
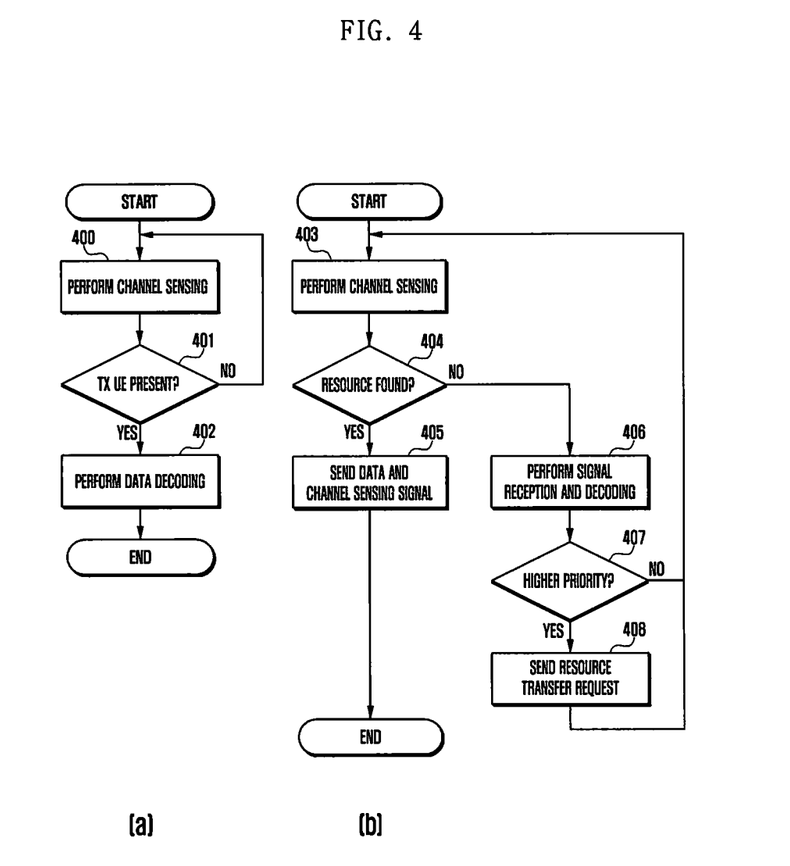
FIG. 4 illustrates D2D Rx UE operation according to an embodiment of the present invention.

FIG. 4 illustrates D2D Rx UE operation according to an embodiment of the present invention.

Part (a) of FIG. 4 illustrates a procedure whereby an Rx UE not having data to send performs data reception. At step 400, the Rx UE performs channel sensing. At step 401, the Rx UE checks presence of a Tx UE sending data. If a Tx UE sending data is present, at step 402, the Rx UE decodes the received data. If a Tx UE sending data is not present, the procedure returns to step 400 at which the Rx UE performs channel sensing. In this case, the Rx UE performs decoding only when a Tx UE sending data is present, avoiding unnecessary decoding. Although not shown, the Rx UE may skip steps 400 and 401 and directly proceed to step 402, at which the Rx UE decodes a received signal. In this case, the Rx UE may perform decoding without regard to presence of a Tx UE sending data, resulting in unnecessary decoding.

Part (b) of FIG. 4 illustrates a procedure whereby an Rx UE having data to send performs data reception. At step 403, the Rx UE performs channel sensing. At step 404, the Rx UE checks whether an unused resource is found. If an unused resource is found, at step 405, the Rx UE sends data and a channel sensing signal via the found resource.

If an unused resource is not found, at step 406, the Rx UE decodes a channel sensing signal received from a Tx UE and identifies priority information of the Tx UE. At step 407, the Rx UE compares its own priority with the priority of the Tx UE. If the Rx UE priority is higher than the Tx UE priority, at step 408, the Rx UE sends a channel sensing signal containing its priority information via the pre-configured transfer request resource. Thereafter, the procedure returns to step 403 at which the Rx UE performs channel sensing. The Rx UE may check presence of a usable resource at step 404 after sending the resource transfer request at step 408.

If the Rx UE priority is not higher than the Tx UE priority, the procedure returns to step 403 at which the Rx UE performs channel sensing.

In one embodiment, multiple pieces of priority information may be applied on the basis of different criteria. As described before, priority values may be assigned according to multiple criteria such user's level of authority and service type.

For example, two priority values for the commander and regular members may be defined according to the user's authority and two priority values for voice and data services may be defined according to the service type. In this case, a UE may notify other UEs of multiple pieces of priority information based on the two criteria through multiple channel sensing signal sequences or input variables of a sequence generation function.

Here, as a first approach, the order of precedence between the criteria may be determined in advance in a hard-coded manner. For example, it is possible to determine in advance that the priority information based on the service type takes precedence over that based on the user's authority. In this case, a UE having a low priority based on the user's authority may have a high priority for resource acquisition if it has a high priority based on the service type. This is because, in an emergency situation, it is necessary to permit a regular member to occupy a resource first for issuing a situation report based on the voice service. This approach is not limited only to the scheme described above. The order of precedence between multiple criteria for priority assignment may be determined in advance and be applied in a hard-coded manner.

As a second approach, the top priority may be assigned to particular data as an exception to the order of precedence between criteria described above. For example, there may be data that is so critical that it must be immediately shared between group members regardless of service type and user's authority. In this case, a user may assign the top priority to the UE thereof through a user interface and the data may be sent together with a channel sensing signal sequence corresponding to the top priority. Specifically, the UE with the top priority may make a resource transfer request by sending a channel sensing signal via the pre-configured transfer request resource without regard to the priority identified through a channel sensing signal from a Tx UE. When a sequence corresponding to the top priority is detected at the pre-configured transfer request resource, the Tx UE sending data may immediately suspend data transmission and yield the occupied resource without performing priority comparison.

Figure 5:
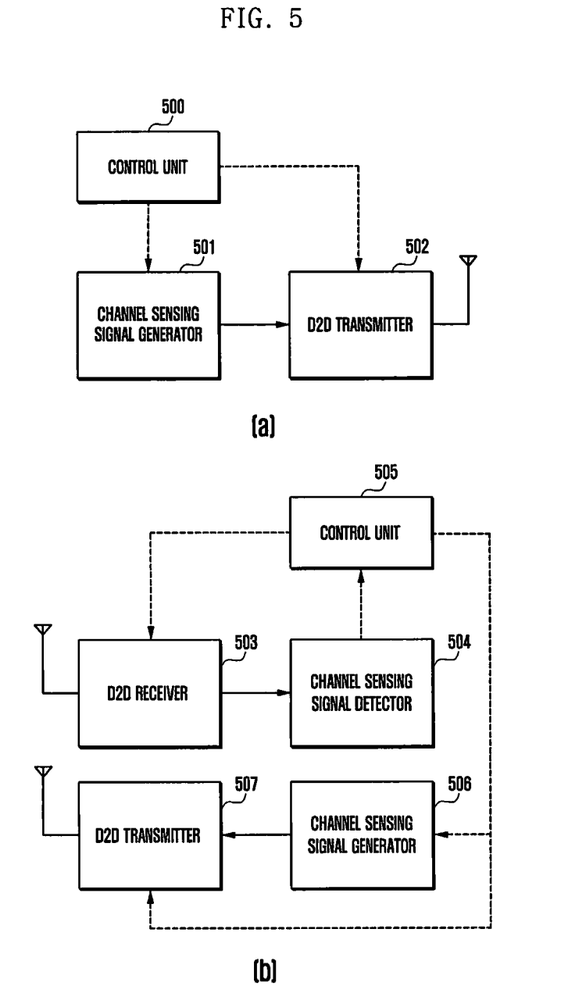
FIG. 5 is block diagrams of D2D Tx and Rx UEs according to an embodiment of the present invention.

FIG. 5 is block diagrams of D2D Tx and Rx UEs according to an embodiment of the present invention. Here, part (a) of FIG. 5 is a block diagram of a Tx UE, and part (b) of FIG. 5 is a block diagram of an Rx UE.

Referring to part (a) of FIG. 5, the Tx UE may include a control unit 500 and a communication unit 502. The control unit 500 may control the Tx UE to carry out an operation according to one of the embodiments described before. For example, the control unit 500 may configure priority information for data to be sent, and control the communication unit 502 to send a channel sensing signal containing the priority information.

In one embodiment, the Tx UE may further include a channel sensing signal generator 501. Under the control of the control unit 500, the channel sensing signal generator 501 may generate a channel sensing signal sequence on the basis of priority information. When data being sent or to be sent is associated with the top priority, the control unit 500 may send a top-priority indication to the channel sensing signal generator 501. Then, the channel sensing signal generator 501 may generate a channel sensing signal containing the top-priority indication.

The communication unit 502 may send and receive signals according to one of the embodiments described before. For example, the communication unit 502 may send a generated channel sensing signal sequence together with data.

In one embodiment, the communication unit 502 may include a D2D transmitter 502. The D2D transmitter 502 may multiplex a generated channel sensing signal sequence and a data channel and send the multiplexed signal via a channel sensing signal transmission resource.

Referring to part (b) of FIG. 5, the Rx UE may include a control unit 505 and a communication unit. In one embodiment, the communication unit may include a D2D receiver 503 and a D2D transmitter 507. The control unit 505 may control the Rx UE to carry out an operation according to one of the embodiments described before. For example, the control unit 505 may control the D2D receiver 503 to receive a D2D signal from a Tx UE and extract a channel sensing signal, and identify priority information of the Tx UE on the basis of the channel sensing signal. The control unit 505 may generate a channel sensing signal sequence containing the priority information of the Rx UE, and control the D2D transmitter 507 to send the generated channel sensing signal sequence. Here, the channel sensing signal may include a resource transfer request, which requests the Tx UE to yield an occupied resource.

The communication unit 503 and 507 may send and receive signals according to one of the embodiments described before. For example, the communication unit 503 and 507 may receive a D2D signal from a Tx UE, and may multiplex a generated channel sensing signal sequence and a data channel to send the multiplexed signal via a channel sensing signal transmission resource.

In one embodiment, the Rx UE may further include a channel sensing signal detector 504 and a channel sensing signal generator 506, separately from the control unit 505. The D2D receiver 503 may receive a D2D signal from a Tx UE and extracts a channel sensing signal. The channel sensing signal detector 504 may detect a channel sensing signal and forward priority information obtained therefrom to the control unit 505. The channel sensing signal may be received from a UE currently sending data or received from a UE having data to send via a pre-configured transfer request resource. The control unit 505 may control the channel sensing signal generator 506 to generate a channel sensing signal containing priority information of the Rx UE. In one embodiment, when data to be sent is associated with the top priority, the control unit 505 may send a top-priority indication and generate a resource transfer request message containing the top-priority indication.

The control unit 505 may control the D2D transmitter 507 to send data and a resource transfer request signal on the basis of the priority information contained in a received channel sensing signal and the resource used to receive the channel sensing signal. Under the control of the control unit 505, the D2D transmitter 507 may multiplex a generated channel sensing signal sequence and a data channel and send the multiplexed signal via a channel sensing signal transmission resource. The control unit 505 may control a decoding operation of the D2D receiver 503 according to a result of channel sensing.

The above description is focused on a transmission scheme based on the 3GPP LTE uplink. However, the present invention is not limited thereto or thereby and may be applied to other transmission schemes.

Hereinabove, exemplary embodiments of the present invention have been described in detail. It should be understood that many variations and modifications of the basic inventive concept described herein will still fall within the spirit and scope of the present invention as defined in the appended claims and their equivalents.

The invention claimed is:

1. A method of device-to-device (D2D) communication by a transmitting user equipment (Tx UE), the method comprising:
   sending a channel sensing signal containing first information on a priority of the Tx UE and data;
   receiving a resource transfer request message containing second information on a priority of a receiving user equipment (Rx UE);
   identifying whether the priority of the Tx UE is lower than the priority of the Rx UE; and
   terminating a transmission of the data in case that the priority of the Tx UE is lower than the priority of the Rx UE,
   wherein the channel sensing signal includes a first sequence in a first symbol and a second sequence in a second symbol, the first symbol and the second symbol are in a same slot of time domain, and
   wherein the first sequence indicates a priority determined based on a service type of the data and the second sequence indicates a priority determined based on information on a user of the Tx UE.

2. The method of claim 1, wherein the resource transfer request message is received through a pre-configured resource.

3. The method of claim 1, wherein the first and second information are assigned and stored in advance in the Tx UE and Rx UE on a per-UE basis.

4. The method of claim 1, further comprising terminating transmission of the data in case that the resource transfer request message containing a top-priority indication is received from the Rx UE.

5. A method of device-to-device (D2D) communication by a receiving user equipment (Rx UE), the method comprising:
   receiving a channel sensing signal containing first information on a priority of a transmitting user equipment (Tx UE);
   identifying whether a priority of the Rx UE is higher than the priority of the Tx UE;
   sending, in case that the priority of the Rx UE is higher than the priority of the Tx UE, a resource transfer request message containing second information on the priority of the Rx UE; and
   performing channel sensing for a preset or randomly selected duration,
   wherein the channel sensing signal includes a first sequence in a first symbol and a second sequence in a second symbol, the first symbol and the second symbol are in a same slot of time domain, and
   wherein the first sequence indicates a priority determined based on a service type of the data and the second sequence indicates a priority determined based on information on a user of the Tx UE.

6. The method of claim 5, wherein the resource transfer request message is sent through a pre-configured resource.

7. The method of claim 5, wherein the first and second information are assigned and stored in advance in the Tx UE and Rx UE on a per-UE basis.

8. The method of claim 5, further comprising:
   receiving information indicating that data to be sent has the top priority; and
   sending a resource transfer request message containing a top-priority indication.

9. A transmitting user equipment (Tx UE) supporting device-to-device (D2D) communication, comprising:
   a transceiver; and
   a controller coupled with the transceiver and configured to control to:
      send a channel sensing signal containing first information on a priority of the Tx UE and data,
      receive a resource transfer request message containing second information on a priority a receiving user equipment (Rx UE),
      identify whether the priority of the Tx UE is lower than the priority of the Rx UE, and
      terminate a transmission of the data in case that the priority of the Tx UE is lower than the priority of the Rx UE,
   wherein the channel sensing signal includes a first sequence in a first symbol and a second sequence in a second symbol, the first symbol and the second symbol are in a same slot of time domain, and
   wherein the first sequence indicates a priority determined based on a service type of the data and the second sequence indicates a priority determined based on information on a user of the Tx UE.

10. The Tx UE of claim 9, wherein the resource transfer request message is received through a pre-configured resource.

11. The Tx UE of claim 9, wherein the first and second information are assigned and stored in advance in the Tx UE and Rx UE on a per-UE basis.

12. The Tx UE of claim 9, wherein the controller is further configured to terminate transmission of the data in case that the resource transfer request message containing a top-priority indication is received from the Rx UE.

13. A receiving user equipment (Rx UE) supporting device-to-device (D2D) communication, comprising:
   a transceiver; and
   a controller coupled with the transceiver and configured to control to:

receive a channel sensing signal containing first information on a priority of a transmitting user equipment (Tx UE), identify whether a priority of the Rx UE is higher than the priority of the Tx UE, and send, in case that the priority of the Rx UE is higher than the priority of the Tx UE, a resource transfer request message containing second information on the priority of the Rx UE, and perform channel sensing for a preset or randomly selected duration, wherein the channel sensing signal includes a first sequence in a first symbol and a second sequence in a second symbol, the first symbol and the second symbol are in a same slot of time domain, and wherein the first sequence indicates a priority determined based on a service type of the data and the second sequence indicates a priority determined based on information on a user of the Tx UE.

14. The Rx UE of claim 13, wherein the controller is further configured to send the resource transfer request message through a pre-configured resource.

15. The Rx UE of claim 13, wherein the first and second information are assigned and stored in advance in the Tx UE and Rx UE on a per-UE basis.

16. The Rx UE of claim 13, wherein, in case that information indicating that data to be sent has the top priority is received, the controller is further configured to send a resource transfer request message containing a top-priority indication.

* * * * *